Aug. 26, 1969

J. R. FITZPATRICK 3,463,189

BLOW-DOWN VENT AND CHECK VALVE

Filed March 7, 1966

INVENTOR.
John R. Fitzpatrick
BY
William S. Dorman
ATTORNEY

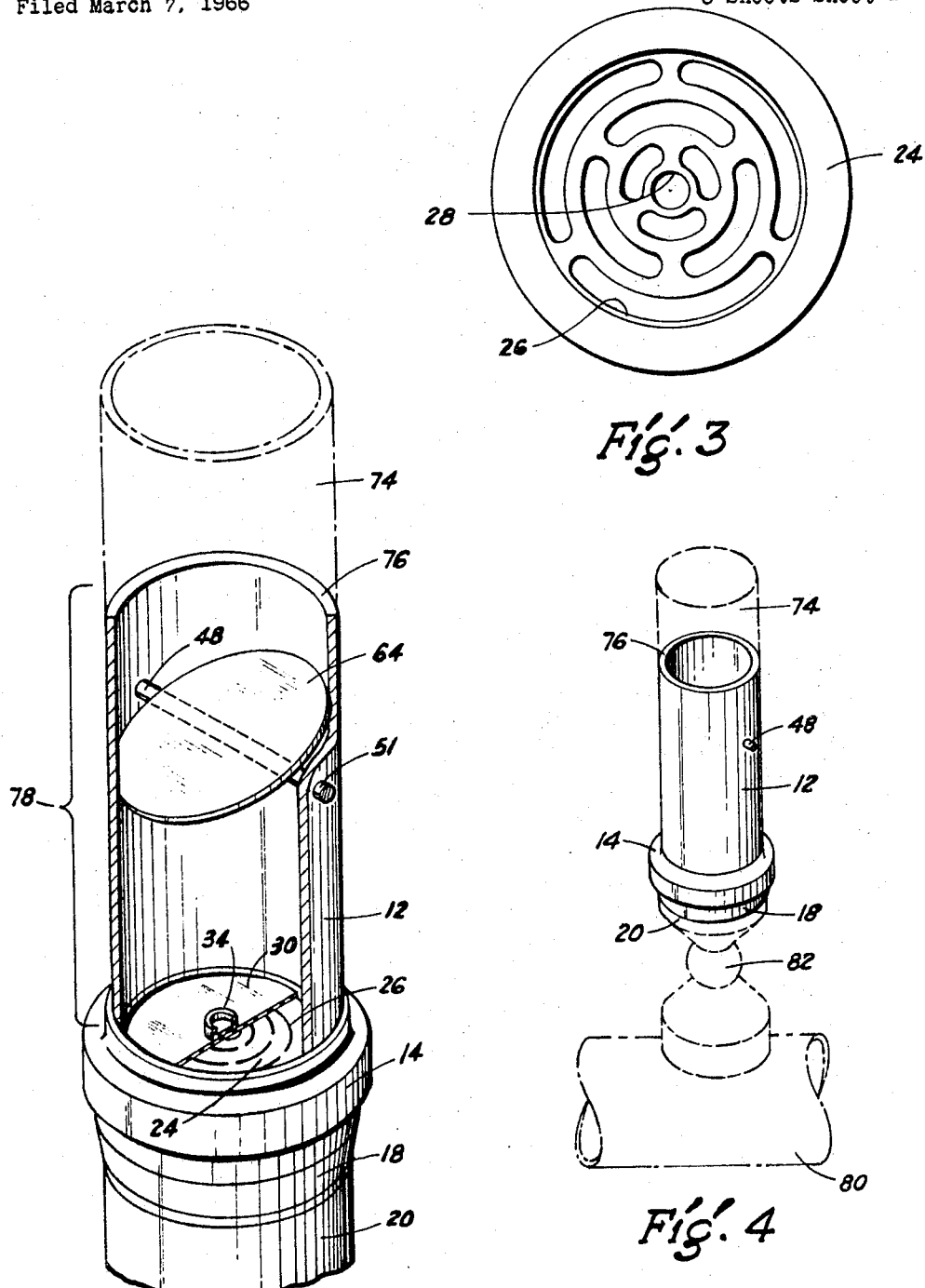

Aug. 26, 1969  J. R. FITZPATRICK  3,463,189
BLOW-DOWN VENT AND CHECK VALVE

Filed March 7, 1966  3 Sheets-Sheet 3

INVENTOR.
John R. Fitzpatrick
BY
William S. Dorman
ATTORNEY

United States Patent Office 3,463,189
Patented Aug. 26, 1969

3,463,189
BLOW-DOWN VENT AND CHECK VALVE
John R. Fitzpatrick, Tulsa, Okla., assignor to Charles Wheatley Company, Tulsa, Okla., a corporation of Oklahoma
Filed Mar. 7, 1966, Ser. No. 532,404
Int. Cl. F16l 55/18; F16k 15/14
U.S. Cl. 137—614.2                               2 Claims

ABSTRACT OF THE DISCLOSURE

A blow-down vent and check valve device for facilitating pipe line repairs by providing a control for the gas in the line during the repair operation. A sleeve is secured to the pipe line above the usual blow-down valve after the pipe line has been evacuated. A one way valve or check valve is disposed in one end of the sleeve and installed in the proximity of the blow-down valve for precluding admittance of atmospheric pressure into the pipe line while permitting the escape of any pressure in the line in excess of atmospheric pressure. A throttle valve is disposed in the proximity of the opposite end of the sleeve and is utilized for controlling the rate of flow of any gas being discharged through the sleeve. The throttle valve is particularly designed to permit the escape of sudden surges of gas which may come through the pipe line in a sudden force.

---

This invention relates to improvements in valve structures and more particularly but not by way of limitation to a blow-down vent and check valve structure for facilitating evacuation of fluids from a pipe line.

Pipe lines for transporting gaseous products normally extend over great distances and are usually buried under the earth. Corrosion and other factors often act on the pipe line to cause deterioration or other damage thereto and as a result it frequently becomes necessary to repair portions of the line. In order to repair such a pipe line the portion which has been damaged or at least that portion which is to be repaired is usually cut from the line by means of a welding torch or the like and the damaged portion is then removed from the line and replaced by a new or repaired portion. Prior to the repairing operation it is usually necessary to remove the gas from the line or at least from that portion of the line which is to be repaired. The most common method for evacuating the gas from the line is to isolate the damaged portion by closing valves on both ends thereof and installing a blow-down valve which may be opened for removing or exhausting most of the gas trapped between the closed valves. As the pipe section is being cut or severed from the line by the welding torch or the like it is desirable to maintain a small amount of gas in the line and positively preclude addition of oxygen to reduce or substantially eliminate an explosive mixture at the welding torch. The low pressure gas remaining in the line reduces the possibility of admission of oxygen and the low pressure gas is usually ignited at the open end of the pipe line when the welding or cutting operation is to take place to preclude accidental explosive ignitions of the gas mixture during the cutting or welding operation. It is highly desirable to maintain the length of the flame emerging from the open end of the pipe at a preselected dimension which is considered the optimum for precluding entry of oxygen into the line at the point of the burning flame. As a result it is important to control the amount of pressure of the gas remaining in the line during the welding or cutting operation.

The present invention contemplates a blow-down vent and check valve structure particularly designed and constructed for facilitating pipe line repairs by providing a control for the gas in the line as well as providing a positive means of precluding entry of oxygen into the line during the repair operation. The novel blow-down vent and check valve structure is secured to the line above the blow-down valve after the line has been evacuated and includes a check member which permits the escape of low pressure gas while simultaneously precluding entry of atmospheric pressure into the line. In addition a throttling valve cooperates with the check valve to control the rate of flow of any gas being discharged from the line whereby a control may be provided for the gas in the line in order to maintain the length of flame at the site of the cutting or welding operation at the optimum or desired length. The throttling valve is particularly designed and constructed to permit the escape of sudden surges of gas, commonly called a "pop," which may come through the line in a sudden force. This precludes accidental damage or blow-out of the valve.

It is an important object of this invention to provide a blow-down vent and check valve structure for facilitating exhausting a fluid from a pipe line or the like.

It is another object of this invention to provide a blow-down vent and check valve structure particularly designed and constructed to provide a safety precaution during the repair of a pipe line or the like.

A further object of this invention is to provide a blow-down vent and check valve structure which permits escape of small quantities of fluid under low pressure from a pipe line and simultaneously precluding entry of atmospheric air into the pipe line.

A still further object of this invention is to provide a throttling or control in combination with a check valve structure to provide a control of the flow of escaping gas to substantially reduce hazard during a pipe line repair operation.

Still another object of this invention is to provide a novel blow-down vent and check valve structure which is simple and efficient in operation and economical and durable in construction.

Other and further objects and advantageous features of the present invention will hereinafter more fully appear in connection with a detailed description of the drawings in which:

FIGURE 2 is a perspective view of a blow-down vent and check valve structure embodying the invention with portions thereof cut away for purposes of illustration.

FIGURE 3 is a plan view of a grid member such as utilized in the invention.

FIGURE 4 is a perspective view of a blow-down vent and check valve structure embodying the invention as installed on a blow-down line with portions hereof in broken lines for purposes of illustration.

Figure 1:
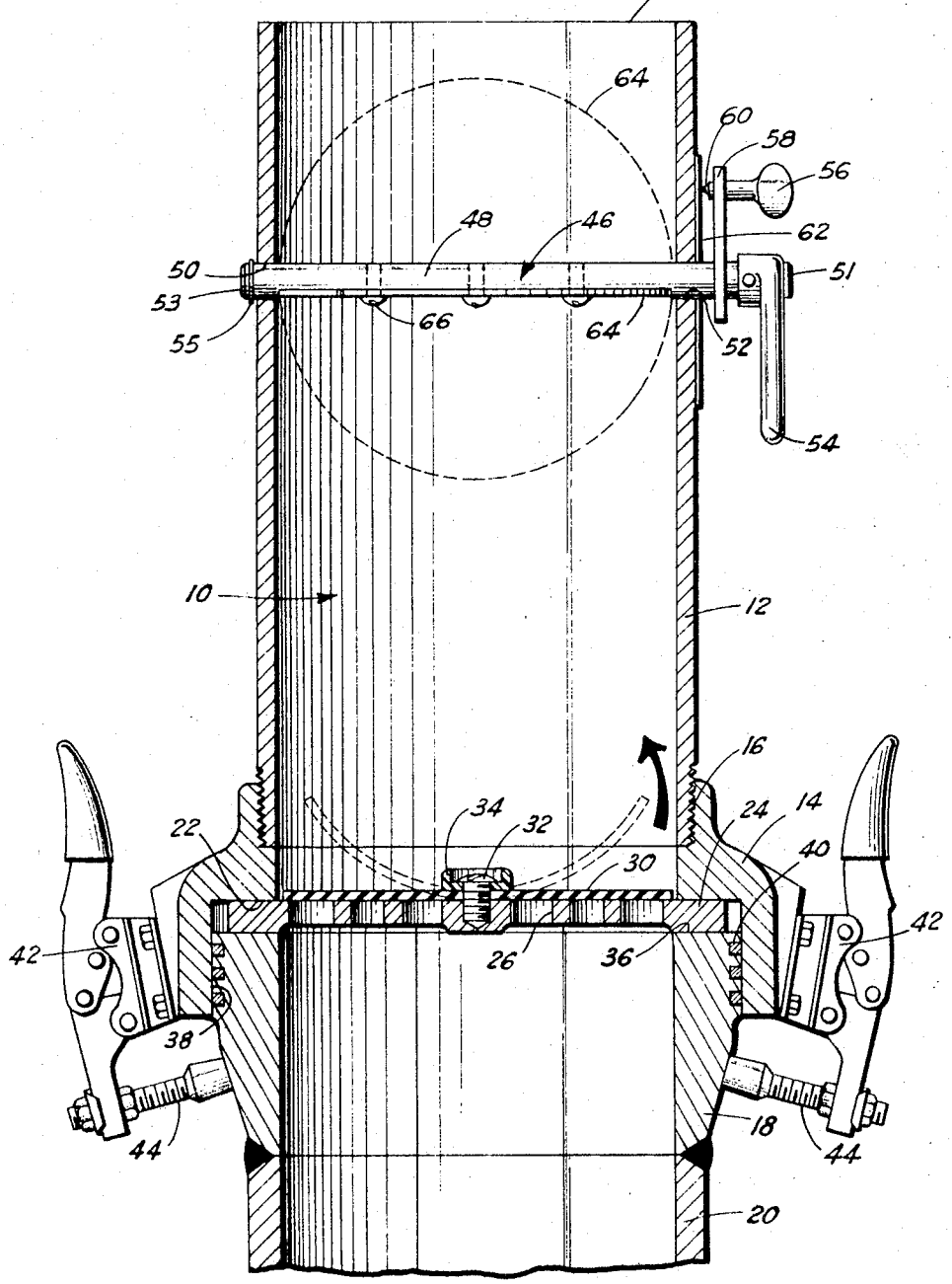
FIGURE 1 is a sectional evaluation view of a blow-down vent and check valve device embodying the invention.

Referring to the drawings in detail, reference character 10 generally indicates a blow-down valve and check valve structure comprising a cylindrical sleeve 12 having a cap or adaptor member 14 threadedly secured at 16 to one end thereof. The sleeve 12 may be constructed from any suitable material but is preferably of a transparent plastic material as particularly shown in FIGURE 5 or provided with a transparent insert in order to provide a window for facilitating visual inspection of the structure 10. The adaptor 14 may be secured to the usual sub member 18 provided on the blow-down line 20 in a manner as will be hereinafter set forth.

The adaptor 14 is preferably provided with an inwardly directed annular shoulder 22 for receiving a plate or disc shaped grid member 24 thereagainst. The grid member 24 may be of any suitable design and as depicted herein is provided with a plurality of circumferentially spaced slots 26 which are preferably concentrically arranged as particularly shown in FIGURE 3. The grid 24 is further provided with a centrally disposed threaded bore 28. A resilient of flexible disc 30 is disposed adjacent one surface of the grid 24 and is secured thereagainst by a threaded stud member 32 which extends through a cup shaped retainer member 34 and into threaded engagement with the bore 28. The disc member 30 is sufficiently rigid as to assume a substantially flat position against the upper surface of the grid as shown in solid lines in FIGURE 1 to provide a normally closed position adjacent the grid 24 during operation of the structure 10. In the closed position of the disc 30 passage of fluid through the apertures or slots 26 is precluded as will be hereinafter set forth.

The grid 24 is retained in position against the shoulder 22 by the open upper end 36 of the sub 18 as particularly shown in FIGURE 1. The adaptor 14 is enlarged at 38 for engagement with the outer periphery of the sub 18 and it is usually preferable to provide a plurality of spaced sealing members 40 between the sub 18 and the adaptor 14 for precluding leakage of fluid therebetween. The adaptor 14 may be removably secured to the sub 18 in any suitable manner and as depicted herein is preferably provided with a plurality of circumferentially spaced toggle clamps 42 of any well known type secured to the outer periphery of the adaptor 14. Each of the toggle clamps 42 is provided with an adjustable locking member 44 adapted to engage the outer periphery of the sub 18 in one position of the respective toggle clamps as clearly shown in FIGURE 1 to retain the adaptor 14 securely locked thereon. Of course manual release of the toggle clamps 42 in the usual manner will release the engagement of the locking members 44 with the sub 18 whereby the structure 10 may be readily removed therefrom when desired.

A throttle valve generally indicated at 46 is provided in the sleeve 12 and spaced from the grid 26. The valve 46 may be of any suitable type; and, as depicted in FIGURE 1 may comprise a transversely extending shaft 48 having the opposite ends thereof suitably journalled in oppositely disposed apertures 50 and 52 provided in the side walls of the sleeve 12. A suitable handle 54 is secured in any well known manner to one end 51 of the shaft 48 whereby the shaft may be manually rotated for a purpose in a manner as will be hereinafter set forth. The opposite end 53 of the shaft 48 may be retained in the aperture 50 by a lock washer or retaining ring 55 as is well known. A positioning screw 56 is carried by the shaft 48 or secured to the shaft 48 by means of a suitable arm 58 which is disposed exteriorly of the sleeve 12. The screw 56 may be provided with a spring loaded pin 60 which bears against the exposed surface of a plate 62 which is suitably secured adjacent the outer periphery of the sleeve 12. The engagement between the pin 60 and plate 62 locks the shaft 48 in any predetermined rotative position of the shaft 48 as will be hereinafter set forth. A throttle disc 64 is carried by the shaft 48 and as shown herein is retained thereon by means of suitable retaining screws 66 which extend through the disc 64 and into threaded engagement with the shaft 48. The disc 64 may be constructed from any suitable material and is preferably constructed from a neoprene synthetic elastomer material which is sufficiently rigid to throttle low pressure gas and yet sufficiently flexible to permit deformation thereof when a surge of higher pressure gas occurs as will hereinafter be set forth in detail.

Figure 5:
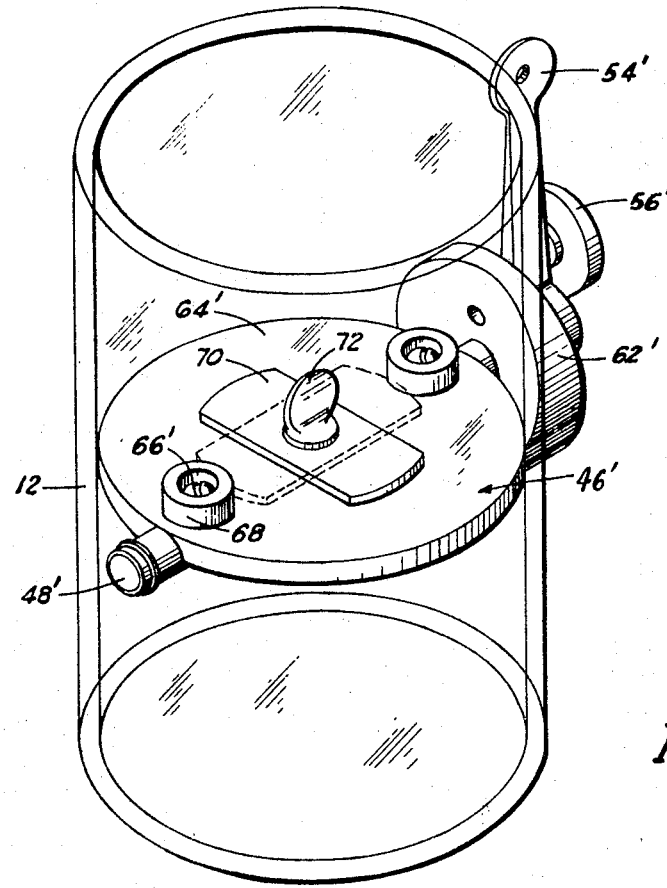
FIGURE 5 is a perspective view of a throttle valve such as utilized in the invention.
Figure 6:
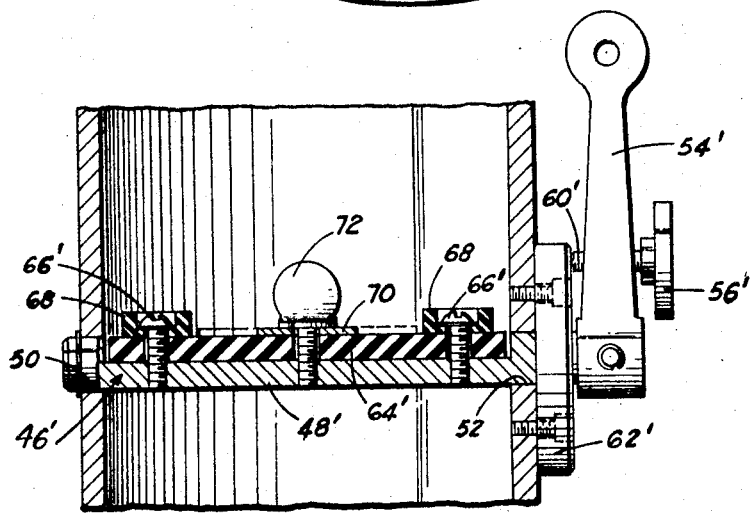
FIGURE 6 is a sectional evaluation view of the throttle valve depicted in FIGURE 5.

Referring to FIGURES 5 and 6, another embodiment of the throttle valve is shown at 46′ wherein a shaft 48′ is journalled in the sleeve 12 and extends therethrough in a manner similar to the shaft 48. A handle or arm 54′ is suitable secured to one end of the shaft 48′ for transmitting rotation thereto. A locking screw 56′ is carried by the arm 54′ and is threadedly secured thereto whereby the inwardly directed end 60′ thereof may be engaged with a plate 62′ which is secured to the outer periphery of the sleeve 12. A throttle disc 64′ similar to the disc 64 is carried by the shaft 48′ and is retained thereon by means of suitable retaining screws 66′ which extend through retaining cups 68 and into threaded engagement with the shaft 48′.

An adjustable stiffener member 70 is secured adjacent the upper or exposed surface of the disc 64′ by means of a thumb screw 72, or the like, which extends through the disc 64′ and into threaded engagement with the shaft 48′. The stiffener 70 is preferably centrally disposed on the exposed surface of the disc 64′ as particularly shown in FIGURE 5 and may be angularly adjusted from the position shown in solid lines to the position shown in dotted lines or any position therebetween in order to provide control of the stiffness of the disc 64′.

An extension tube 74 may be removably secured to the open upper end 76 of the sleeve 12, if desired, in order to discharge escaping gases at a higher position than the open end of the pipe. In addition, a suitable static electricity ground connection 78 may be connected between the extension tube 74 and the adaptor 14 if the extension tube is of a metallic structure.

Operation

When a pipe line 80 (FIGURE 4) is to be repaired, or the like, the gas pressure in the line may be exhausted or reduced, as desired, by use of a suitable blow-down valve 82 in the usual manner. After the line 80 has been blown-down, the adaptor 14 may be disposed over the open end 36 of the sub 18 which is normally provided in conjunction with the blow-down valve 82, and the clamps 42 may be utilized in the normal manner for securely clamping the device 10 to the sub 18. Thus, the grid 24 and valve disc 30 are securely clamped between the upper end 36 of the sub 18 and the shoulder 24 of the adaptor 14.

The open end 76 of the tube or sleeve 12 is open to atmosphere and consequently the upper or exposed face of the disc 30 is subjected to atmospheric pressure. The internal pressure of the line 80 is transmitted to the under face of the disc 30 through the ports or slits 26. As hereinbefore set forth, it is desirable to maintain a small quantity of gas, or a supply of low pressure gas in the line in order to reduce the possibility of oxygen entering the line during the repair operation. As a welding torch, or the like, (not shown) is being used for cutting or otherwise working on the line 80, the gas escaping from the open end (not shown) of the line 80 is ignited in order to preclude any accidental explosion at the welding site during the repair operation. It is highly desirable to maintain the length of the flame emerging from the line 80 substantially constant to preclude entry of oxygen into the line which might create a more combustible mixture therein.

The valve disc 30 normally lies flat against the grid 24, as shown in solid lines in FIGURE 1, to positively preclude the passage of atmosphere into the line through the ports 26. Of course, when the pressure in the line 80 acting on the undersurface of the disc 30 exceeds atmospheric pressure, the disc 30 will flex upwardly, as shown in dotted lines in FIGURE 1, to permit the excess gas to escape through the ports 26 and into the sleeve 12. The material from which the disc 30 is constructed is particularly selected to permit very small quantities of gas to escape from the line 80, thus providing a very accurate control of the pressure which is maintained within the line 80.

When the throttle valve 46 is in the full opened position, as shown in dotted lines in FIGURE 1, any gas escaping through the ports 26 is exhausted through the open end 76 of the sleeve 12 with substantially no interference. However, when it becomes desirable to control the rate of flow of the escaping gas for any reason, such as to maintain the length of the flame or flare at the welding site, the handle 54 may be utilized in the usual manner by rotating the shaft 48 to position the disc 64 within the sleeve 12 to provide the desired throttling of the escaping gas. The thumb screw 56 may be backed off or released from engagement with the plate 62 to permit freedom of rotation of the shaft 48. When the disc 64 has been moved to the desired position the adjusting screw or thumb screw 56 may be tightened for engagement with the plate 62 in order to securely retain the disc 64 in the preselected position. It will be readily apparent that the valve disc 30, which permits escape of very small quantities of gas at low pressure, in cooperation with the throttling valve 46 provides a safety feature for controlling the gas in a line being repaired.

As hereinbefore set forth the disc 64 of the throttle valve 46 is constructed of a suitable neoprene synthetic elastomer material or the like which is rigid enough to maintain a normal disc-shaped configuration as shown in the drawings but flexible enough to be deformed when a sudden surge of high pressure gas moves into contact with the disc 64. During repair operations and the like in gas lines, back pressure frequently builds up and when this occurs the excessive high pressure will be exhausted through the check valve disc 30 for exhaust around the throttle valve 46. Of course, if the throttle valve is in a substantially closed position, this excessive pressure could cause destruction of the shaft assembly or valve assembly, but since the disc 64 is sufficiently flexible to deform and allow the surge of pressure to escape around the valve 46 protection is provided for the total valve 46.

From the foregoing it will be apparent that the present invention provides a novel blow-down vent and check valve structure particularly designed and constructed for utilization as a safety means for facilitating control of internal pressure, particularly low pressure, in a gas line during repair work or the like on the line. The novel check valve portion permits the escape of very small quantities of gas at low pressure and in combination with the throttle valve member provides for an accurate control of low pressure in the main line. The novel blow-down vent and check valve is simple and efficient in operation and economical and durable in construction.

What is claimed is:

1. A blow-down vent and check valve device for a gas line comprising a sleeve, said sleeve having one end open to the atmosphere and having an adaptor member threadedly secured to the opposite end thereof, an inwardly directed annular shoulder provided on the inner periphery of the adaptor member, said adaptor member having an internal enlarged portion for receiving one end of a pipe connecting member, and pipe connecting means to secure the sleeve to the pipe connecting member, an apertured grid member clamped between the pipe connecting member and annular shoulder, a flexible valve disc member secured adjacent to the face of the grid member oppositely disposed from the pipe connecting member, said valve disc member being disposed in a normally closed position against the said face of the grid member and being sufficiently flexible for flexing in a direction away from the grid member to permit one way flow of fluid through the grid member, a throttle valve disposed in the sleeve member and interposed between the end open to the atmosphere and the grid member, means for rotating the throttle valve to substantially any desired position within the sleeve, and means for locking the throttle valve in substantially any desired rotative position within the sleeve.

2. A blow-down vent and check valve device for gas line as set forth in claim 1 wherein the throttle valve comprises a shaft journaled in the sleeve and extending transversely therethrough, a disc member carried by the shaft and rotatable simultaneously therewith, said disc being sufficiently rigid to provide for throttling of the flow of fluid through the sleeve and being sufficiently flexible for deformation thereof upon surges of high pressure gas through the sleeve.

References Cited

UNITED STATES PATENTS

| 3,111,300 | 11/1963 | Boone | 251—306 |
| 3,156,418 | 11/1964 | Jablonski | 240—84 |
| 3,181,833 | 5/1965 | Adams | 137—614.2 |
| 3,311,128 | 3/1967 | Taylor | 251—306 |

FOREIGN PATENTS 1,092,221   11/1960   Germany.

WILLIAM F. O'DEA, Primary Examiner

HOWARD M. COHN, Assistant Examiner

U.S. Cl. X.R.

137—512.15, 515.7, 525.3; 251—121, 306